Oct. 8, 1940.  E. B. SACKETT  2,217,323
PORTABLE REEL CONSTRUCTION
Filed July 19, 1938
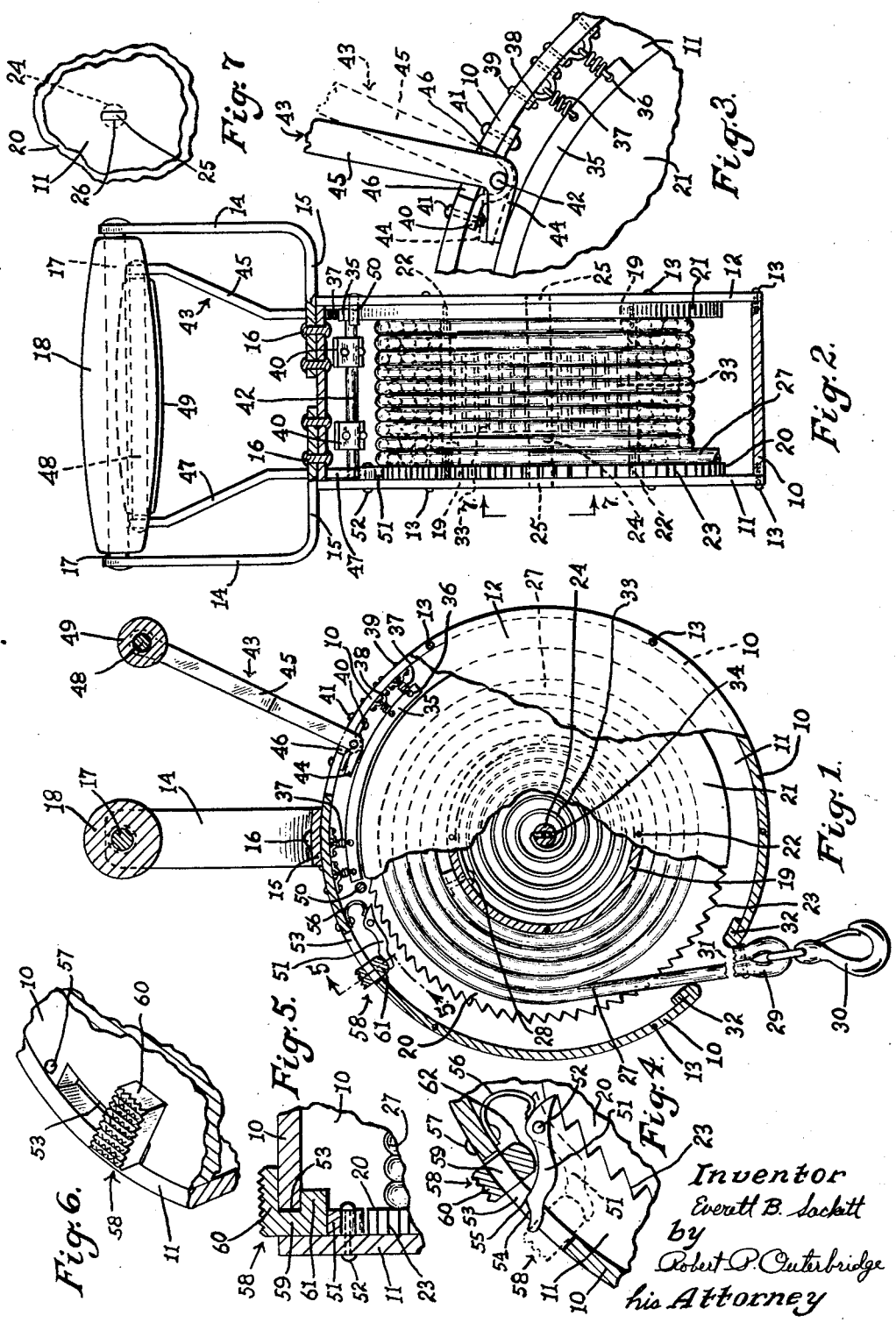
Inventor
Everett B. Sackett
by Robert P. Outerbridge
his Attorney Patented Oct. 8, 1940

2,217,323

UNITED STATES PATENT OFFICE 2,217,323

PORTABLE REEL CONSTRUCTION

Everett B. Sackett, Cambridge, Mass.

Application July 19, 1938, Serial No. 220,042

5 Claims. (Cl. 242—98)

The present invention relates generally to reel constructions and more particularly to portable reels of the type in which a leash adapted for use on domestic animals such, for example, as a dog is located for movement into and out of a casing or housing.

The basis for using a leash on a dog is that when he is taken out for a walk or an airing, he is to be allowed only a limited freedom of movement, and this end is achieved in one manner by the use of a simple leash consisting of a length of leather, chain, cord, or the like, having a loop or handle on one end and a snap on the other end for attachment to the dog's collar. Such leashes are in common use and are well known, but also well known are certain disadvantages attending their use. Under ideal conditions the leash, while not taut as when the dog tugs and strains at it, is yet pulled out sufficiently so that it does not drag on the ground and thus be subject to abrasion. Such conditions exist when the dog moves away from his master to only substantially the limit of distance which the leash affords. But as every dog owner knows, this desirable condition of leash extension exists only at intervals, for a dog on a leash frequently slows up or approaches his master, thereby giving the leash sufficient slack so that it is best to pull it in to avoid dragging or tangling, and the act of pulling in a leash involves either a motion by the arm of the leash-holding hand to cause the leash to coil around the hand or else the use of both hands somewhat in the manner of hauling in rope. If the dog thereafter wants to move away from his master, the coiled or pulled-in leash is released, but if the dog does not immediately move to his original spaced position, the leash is best fed out only by degrees, an operation which also requires the use of one or both hands, and requires as much attention as does the act of pulling it in. As a further matter, it may be desirable under some conditions that the dog not be allowed to walk or roam to the extent which a fully extended leash of a given length would permit, and when this is the case part of the leash must either be held coiled or taken up by one hand, or both hands must be used. This situation also has its disadvantages, for inconvenience is experienced if the dog tugs on the leash while the latter is so held, and attention is also required if it is intended to feed any or all of the leash out. As a final matter, if the leash is shortened or is slack under these conditions and the dog suddenly bolts away, he tautens the leash with a jerk which may be harmful to his neck, and in any event produces a leash-holding situation for his master which is particularly inconvenient if only one hand is used to hold the dog back and which may require the use of both hands.

The above remarks list some of the disadvantages of using the well known simple leash, that is, the disadvantages which attend holding it directly by the hand or hands and controlling it while so held. In view of the foregoing, it is the principal object of the present invention to provide a leash-holding reel construction having such characteristics as to simplify the use of a leash and to minimize the attention which must be paid to a leash under the varying conditions which a roaming dog on its outer end produces.

To the accomplishment of this object and of such others as may hereinafter appear, the various features of the present invention reside in certain constructions, combinations, and arrangements of parts fully set forth in the following disclosure and then pointed out broadly and in detail in the appended claims, possessing advantages which will be readily appreciated by those skilled in the art.

The various features of the present invention will be readily understood by reading the specification in connection with the accompanying drawing which illustrates the best physical embodiment of the invention at present known to the inventor and in which:

Fig. 1 is a view in right side elevation of a reel construction embodying the invention, portions being cut away at varying depths to show underlying parts;

Fig. 2 is a view in front elevation of the reel construction shown in Fig. 1, a portion of the cylinder being cut away to show underlying parts and the pawl slide and spring not being shown;

Fig. 3 is an enlarged detail view taken from Fig. 1 and showing the operative and inoperative positions of the lever for actuating the brake shoe;

Fig. 4 is an enlarged detail view also taken from Fig. 1 and showing the operative and inoperative positions of the pawl for controlling the ratchet;

Fig. 5 is an enlarged detail view taken along the line 5—5 of Fig. 1;

Fig. 6 is an enlarged detail view in perspective showing the pawl slide and the casing slot in which it is movable; and Fig. 7 is a detail view taken along the line 7—7 of Fig. 2.

Referring to the drawing, particularly Figs. 1 and 2, the illustrated embodiment of the present invention is provided with a casing or housing which comprises a cylinder 10 to the respective opposite ends of which disc-like plates 11 and 12 are detachably secured, as by screws 13, so that an enclosure is formed. In order to support the casing manually a handle construction is provided comprising a pair of oppositely disposed upright arms 14 provided at their lower ends with integral and inwardly bent portions 15 which are secured to the cylinder 10 as by rivets 16. The upper ends of the arms 14 receive a rod 17 on which a grip 18 is loosely mounted for rotation, and as will be seen from Fig. 2, the grip 18 extends transversely of the casing and by reason of the extension of the arm portions 15 outwardly from the plates 11 and 12 the grip 18 has a length such as will easily permit its being held by the four figures of a user's hand. As will be apparent from remarks made infra, it is intended that when the construction is in use the user's supporting fingers be bent rearwardly, and as shown in Figs. 1 and 2 there is ample finger room vertically between the grip 18 and the cylinder 10.

Mounted within the above-described casing so as to be rotatable therein in opposite directions is a leash support comprising a cylinder or drum 19 to the respective opposite ends of which discs 20 and 21 preferably of the same size are detachably secured, as by screws 22 which do not extend beyond the outer faces of the discs. As shown in Figs. 1 and 2 the discs 20 and 21 are adjacent the casing plates 11 and 12, respectively, the drum 19 being of such length as to permit this arrangement, and the disc 20 has a notched periphery forming ratchet teeth 23, while the periphery of the disc 21 is smooth. As indicated in Figs. 1–5 as the case may be, the discs 20 and 21 have a diameter greater than that of the drum 19, but less than that of the plates 11 and 12. By reason of the screws 22, the drum 19 and the discs 20 and 21 form what in effect is a unitary construction of spool formation, and to provide for the rotation of the spool within the casing, the center portions of the discs 20 and 21 loosely receive the opposite end portions, respectively, of the axle 24 which extends transversely within the casing and also within the drum 19 and is provided with substantially rectangular reduced ends 25 (Figs. 2 and 7) received in slots 26 formed centrally in the casing plates 11 and 12, respectively. By reason of this construction the spool or support formed by the drum 19 and the attached discs 20 and 21 is freely rotatable on the axle 24, but the axle itself is held from rotation.

Wound around the drum 19 and located between the discs 20 and 21, which in effect form flanges with respect to the exterior of the drum, is a leash 27 (Figs. 1, 2, and 5) which, merely for purposes of disclosure, is shown as being circular in cross section and may be made of leather or woven fabric, it being understood that the cross sectional shape of the leash, and also the material of which it is made, may be varied within the scope of the present invention. The inner end of the leash 27 abuts the outer surface of the drum 19 to which it is secured as by a rivet 28, and the outer end of the leash, provided with a loop 29 to which a suitable snap 30 is secured, passes through an opening 31 located in the front lower portion of the cylinder 18. The opening 31 may conveniently be formed by cutting the cylinder transversely before assembly and then bending the end portions 32 at the cut inwardly, as shown in Fig. 1, thereby providing smooth edges which the leash 27 may engage in its movement. Preferably, although not necessarily, the opening 31 has a width somewhat less than that of the widest dimension of the snap 30, thereby preventing the entrance of the snap into the casing. By reason of the above-described construction it will be seen that since the leash 27 is wound on the drum 19 and since the inner end of the leash is secured to the drum, any pull on the leash exerted in a direction away from the casing will cause the spool to rotate counter-clockwise, viewing Fig. 1, thereby permitting any desired portion of the leash to pass out of the casing by way of the opening 31.

The preceding remarks deal with the movement of the leash 27 out of the casing opening 31 and with the counter-clockwise (Fig. 1) rotation of the spool that is effected thereby. In order to provide for a return movement of the leash into the casing, the present invention contemplates the use of means for rotating the spool in a clockwise direction (Fig. 1), thereby achieving this end. Broadly speaking any means may be utilized suitable for this purpose, but in view of the variable conditions attendant the use of a leash in a reel construction, it is preferred that the means for drawing the leash 27 back into the casing by way of the opening 31 be automatic in operation. To this end a coil spring 33 (Fig. 1) of substantial width (Fig. 2) is located within the drum 19, the inner end of the spring 33 being received in a slot 34 (Fig. 1) formed in the axle 24 and the outer end of the spring being suitably secured to the inner surface of the drum 19, as by rivets. Conveniently one of these rivets may be the rivet 28 which also serves to secure the leash 27 to the drum, but any other suitable means of drum and spring attachment may be provided. By reason of the above-described construction, it will be seen that as the leash 27 moves out of the casing opening 31 and thereby rotates the spool in a counter-clockwise direction (Fig. 1), the rotation of the spool serves to wind up the spring 33 to a lesser or greater extent, depending on how much leash moves out of the casing, thereby causing the spring to be stored with power. It will also be seen that by reason of the above-described construction, upon any release of pull on the leash 27, the power stored in the spring 33 will also be released, resulting in the rotation of the spool in a clockwise direction (Fig. 1) and so causing a leash portion to be drawn back into the casing. The spring 33 should be preferably somewhat more than just strong enough to pull all the leash 27 back into the casing to the limit determined by the snap 30, but of course is weak enough, relatively speaking, to offer a sufficiently yielding resistance to the pull which a dog would exert in moving away from the casing after the snap 30 has been secured to his collar.

Regarding the illustrated embodiment of the present invention as so far described as being in actual use, it will be seen that since the spring 33, although yielding, is strong enough to draw the leash 27 back into the casing upon the release of any pull thereon, there is substantially no slack in the leash as the dog moves about and away from his master, and it will also be seen that should the space between the dog and his master decrease for any reason, the spring 33 will rotate the spool and draw in a leash portion, thereby taking up what would otherwise be slack and which frequently results in the leash and the dog, and even his master, becoming tangled up or in the leash dragging on the ground. As this taking up of the leash is completely automatic by reason of the release of power stored in the spring 33, the user of the construction neither has to move his arm to wind slack leash around his leash-holding hand nor does he have to use both hands in taking in leash. He need give no more attention than is usual in merely watching the dog, for slack taking-in occurs automatically, and this amounts actually to less attention than usual because the spring 33 prevents the occurrence of difficulties which attend the use of ordinary leashes.

The illustrated embodiment of the present invention is well suited for preventing the formation of slack in a leash, but there are other situations in leash use which the illustrated embodiment, as only so far described, is not adapted to meet. One of these arises where the leash is extended less than its full amount and the dog suddenly bolts ahead, as when chasing another dog. Another situation arises where it is desired that the leash be short, that is, where it is desired that the dog's freedom of movement be restricted even more than is provided by a leash fully extended. The operation provided by the spring 33 does not meet either of these conditions, for the spring 33 does not function to prevent the further pulling out of a leash only partially pulled out, nor does it function to give a leash any effective and constant shortened length.

To take care of the first of these situations, that is, to halt a dog which suddenly bolts out when the leash is not fully extended and to bring him to a halt with a minimum of jerk on his neck, the present invention contemplates the provision of a brake whereby the dog's progress may be slowed down and even halted. While this brake construction may take any suitable form, in the illustrated embodiment of the present invention a preferred form is shown comprising a brake shoe and controlling means therefor.

Referring particularly to Figs. 1-3, there is provided a brake shoe 35 which comprises an arcuate member adapted to overlie a portion of the disc 21 and be spaced from the casing plate 12. The upper and lower surfaces of the shoe 35 are preferably concentrically curved, the center of curvature being identical with that of the disc 21 and the plate 12, and in order to support the shoe, it is provided at each of its opposite end portions with preferably two spaced openings 36 through each of which the lower end of a coil spring 37 is clipped. The upper ends of the springs 37 are clipped around the depending portions, respectively, of brackets 38 which are secured by rivets 39, for example, to the inner surface of the cylinder 10, and the springs 37 are of such length and the shoe 35 is of such height that the latter is normally supported by the former in spaced relation (Fig. 1) to the periphery of the disc 21, which may now be called a brake disc. By reason of this construction it will be seen that force applied downwardly on the central portion of the shoe 35 will result in its descent into engagement with the disc 21 to brake it and that upon the release of applied force, the springs 37 will elevate or retract the shoe 35 out of engagement with the disc 31.

In order to thus apply force to the brake shoe 35, the illustrated embodiment of the present invention is provided with a lever arrangement which, in its entirety, amounts to a pivoted and secondary handle construction. Referring particularly to Figs. 1-3, at a point spaced rearwardly and downwardly (Fig. 1) from the rivets 16 the cylinder 10 is provided with a pair of spaced brackets 40 secured to the inner face thereof by rivets 41, while journaled in the brackets 40, as best shown in Fig. 2, is a shaft 42 substantially as long as the distance between the casing plates 11 and 12. The right hand end (Fig. 2) of the shaft 42 is received in an opening formed at the junction of the two arms of a bell crank lever 43 which, as shown in Figs. 1 and 3, has a generally forwardly extending lower arm 44 and an upwardly and rearwardly extending upper arm 45. The lever arm 44 and the lower end of the lever arm 45 lie in a plane, and as shown in Fig. 2 the latter arm extends out of the casing from a point within located over the brake disc 21, and to permit this outward extension the cylinder 10 is provided with a slot 46 (Figs. 1 and 3) which receives the lever arm 45 and in which it is movable with respect to the shaft 42 as a pivot. The outer edge of the bend at the junction of the lever arms is preferably rounded, and as shown in Figs. 1 and 3 the length of the lever arm 44 is such that its free end overlies substantially the center of the brake shoe 35. The normal position of the bell crank lever 43 is shown in full lines in Fig. 1 and in construction lines in Fig. 3, it being noted that when in this position the rear end wall of the cylinder slot 46 serves as a stop to limit the rearward movement of the lever while the forward end wall of the slot 46 is spaced from the arm 45, and that the lower arm 44 is disengaged with the brake shoe 35. By reason of this construction, it will be seen that when the upper arm 45 of the lever 43 is swung forwardly in the slot 46, thereby assuming the full line position shown in Fig. 3, the lower arm 44 is swung downwardly to move the brake shoe 35 downwardly against the yielding resistance of the springs 37, thereby causing the periphery of the brake disc 21 to be engaged by the brake shoe 35 with substantially even pressure throughout the length of its lower curved surface as shown in Fig. 3. As a consequence, depending on the amount of forward pressure exerted on the arm 45, the rotation of the brake disc 21, and therefore of the drum 19 and the notched disc 20, will be slowed up or stopped, resulting in a slowing up or stopping of the movement of the leash 27 out of the casing opening 31. A release of pressure on the bell crank lever 43 serves to release the power stored in the springs 37, which thereupon elevate the brake shoe 35 to its Fig. 1 position and also swing the bell crank lever to its Fig. 1 position, shown in construction lines in Fig. 3, in which position the lever tends to remain, influenced by the springs 37, since the center of gravity of the lever is well rearward of the shaft 42.

In view of the fact that it is intended in the use of the illustrated embodiment of the present invention that the construction be supported with the fingers of the hand bent rearwardly, it will be seen that the bell crank lever 43 is intended to receive its forward pressure from the thumb. But since the lever 43 is narrow, so that the thumb might easily slip off it, and since the lever 43 is located at one side of the casing, thereby minimizing the leverage obtainable because force applied directly to the lever itself by the thumb would tend to twist the construction as supported by the hand, it is preferred that there be provided structure which, with the lever 43, forms a pivoted and secondary lever and handle construction, as stated above.

To this end there is provided an arm 47, corresponding to the lever arm 45 and aligned therewith, but extending out of the casing from a point within located over the notched disc 20, the cylinder 10 being provided with a slot (not shown) corresponding to and aligned with the slot 46 (Figs. 1 and 3) to permit this. With reference to Fig. 2, the lower end of the arm 47 is pivoted on the shaft 42, as is the bell crank lever 43, and above the cylinder 10 the arm 47 and the lever arm 45 are bent upwardly and outwardly and then upwardly again where they receive a rod 48 on which a grip 49, shorter than the grip 18, is loosely mounted for rotation and for receiving the lever-moving force of the thumb.

By reason of this construction the bell crank lever 43, the arm 47, and the rod 48 and grip 49 are movable as a unit, and by reason of the grip 49 the thumb not only has a larger surface to contact than would be the case if it were to contact only the lever 43 but also has its forward force distributed transversely of the construction, thereby minimizing any tendency of the construction to twist in the user's hand and as a consequence permitting the maximum leverage by the lever arm 44 on the brake shoe 35.

Regarding the illustrated embodiment of the present invention as so far described as being in actual use, it will be seen that the bell crank lever 43, the arm 47, and the rod 48 and grip 49 are sufficiently spaced rearwardly (Fig. 1) from the grip 18 as not to engage or interfere with the user's fingers as they support the construction from the grip 18, and that since the dog is assumed as having pulled the leash 27 only partially out of the casing and is quiet, the user's thumb will not be engaged with the grip 49. If, however, the dog should suddenly bolt ahead, his master has but to swing his thumb against the rear of the grip 49, its relative shortness easily permitting this, and make a grasping motion with his fingers and thumb, for this grasping motion causes the grip 49 to move forwardly and therefore causes the lever arm 44 to move downwardly and as a consequence effects braking engagement between the brake shoe 35 and the brake disc 21 with the result that the bolting dog is either slowed down, gradually or abruptly depending upon the force of the grasp, or is stopped. This result can be obtained by simple movements of only one hand, and as a consequence there does not exist the necessity of using both hands as is frequently the case in the use of simple leashes, and should the dog become quiet again so that he no longer needs to be held back, the slipping of the thumb from the grip 49 or a relaxing of the grasp releases the brake, whereupon the coil spring 33 resumes its function of preventing slack in the leash while permitting the dog to roam. As indicated in Figs. 1 and 2 the grip 49 is preferably somewhat lower than the grip 18, this construction being provided to facilitate the grasping of the grips 18 and 49 simultaneously. The human hand is so constructed that in a grasping motion such as would occur while the fingers hold the grip 18, the crook of the thumb is at a somewhat lower level than is the grip 18.

As a further feature of construction, it will be appreciated that since the brake shoe 35 in the illustrated embodiment of the present invention has a certain freedom of longitudinal movement because of its support from the springs 37, and since the brake shoe 35 is moved into engagement with the brake disc 21 while it is in motion, the friction set up between their two adjacent faces might cause the shoe to move somewhat forwardly in the direction of rotation of the disc. As such shoe motion might warp the springs 37 or stretch them unduly, the illustrated embodiment of the present invention is provided with a stop 50 (Figs. 1 and 2) secured to the casing plate 12 and lying just ahead of the forward end of the brake shoe 35, thereby serving as an abutment which permits movement of the brake shoe downwardly into engagement with the disc 21 but which limits any movement of the brake shoe longitudinally resulting from its engagement with the disc 21 when in motion.

In order to maintain the leash 27 pulled out of the casing opening 31 for a distance less than its full length, the user of the illustrated embodiment of the present invention can, of course, maintain a tight grasp on the grips 18 and 49 simultaneously and thereby hold the spool stationary. But as this would result in a strain on the hand and in its becoming tired, it is preferred that there be provided a construction which is adapted to lock the spool in any one of a plurality of rotative positions and which is entirely separate from the braking mechanism so that, if desired, either may be actuated to the exclusion of the other, that is, independently thereof.

To this end the illustrated embodiment of the present invention is provided with a pawl 51 (Figs. 1, 2, 4, and 5) which is pivotally mounted adjacent its rear end or head on a pin 52 carried by the casing plate 11 near the inwardly bent portion 15 of the left upright arm 14. As shown in Figs. 2 and 5, the pawl 51 is substantially as wide as the notched disc 20 and is aligned therewith, and as shown in Figs. 1 and 4 the pawl has a forwardly extending portion or tail which underlies a slot 53 (Figs. 1, 4, 5, and 6) formed by cutting away a portion of the cylinder 10. The greater portion of the upper surface of the tail of the pawl 51 is concave, as indicated, but terminates forwardly in a second concave surface 54 separated from the first by a convex surface 55.

The pawl 51 may be positioned so that its head engages a ratchet tooth 23, as shown in full lines in Fig. 4 and in which case the forward portion of its tail is located in the slot 53, or the pawl may be positioned in spaced relation to the disc 20 and its teeth 23, as shown in construction lines in Fig. 4 and in full lines in Fig. 1, in which case the pawl is entirely within the casing. When in the first-described position the pawl 51 serves to lock the disc 20, and therefore the drum 19 and the brake disc 21, against rotation in a counter-clockwise (Fig. 1) direction, thereby preventing the movement of a leash portion out of the casing opening 31, and to maintain the head of the pawl engaged with a ratchet tooth 23 for this purpose, a curved spring 56 is provided, one end of which is secured to the inner surface of the cylinder 10 as by a rivet 57 and the other end of which curves upwardly and engages the head of the pawl 51 to swing it downwardly. So far as the actual use of the illustrated embodiment of the present invention is concerned, the locking position of the pawl 51 as just described is not, of course, its normal one.

In order to move the head of the pawl 51 out of engagement with a ratchet tooth 23 and so place the pawl in what may be called its normal position when the illustrated embodiment of the present invention is in actual use, the slot 53 receives a U-shaped slide 58 (Figs. 1, 4, 5, and 6) adapted to move in the slot from a position in which it does not interfere with the locking engagement of the head of the pawl 51 with a rachet tooth 23 to and from a position in which it maintains the pawl 51 out of engagement with any ratchet tooth, thereby unlocking the notched disc 20. Referring particularly to Fig. 5, the slide 58 comprises a central portion 59 located in the slot 53 and upper and lower inwardly directed arms 60 and 61, respectively, the oppositely disposed faces of which embrace the opposite faces of the adjacent portion of the cylinder 10 for sliding movement therealong. The upper slide arm 60 is preferably longer than the lower arm 61 and may be provided with a roughened top, while the lower arm 61 is adapted to engage and swing the tail of the pawl 51 as will be seen by comparing Fig. 5 with Figs. 1 and 4 and is provided with a convex under surface 62 substantially identical in extent and curvature with the concave surface 54 on the tail of the pawl 51.

The slot 53 has such length that when the slide 58 is moved rearwardly, that is, to the right as shown in full lines in Fig. 4, its lower arm 61 does not engage the pawl 51 and so does not interfere with the pressure exerted by the spring 56 to maintain the head of the pawl in position to lock the notched disc 20. When, however, the slide 58 moves forwardly, that is, to the left viewing Figs. 1 and 4, the slide arm 61 does engage the upper surface of the tail of the pawl, and during continued movement swings the tail downwardly and the head upwardly against the resistance offered by the spring 56, until the head of the pawl is clear of the teeth 23 of the disc 20 and the convex under surface 62 of the slide arm 61 has passed the convex surface 55 on the tail of the pawl and engages the concave surface 54 at its end, as shown in full lines in Fig. 1 and in construction lines in Fig. 4. It is contemplated that the slide 58 be manually moved in the slot 53, but since the spring 56 is constantly pressing on the head of the pawl 51, and since the pawl's tail surface 55 forms in effect a shoulder with respect to the slide arm 61 when the coacting surfaces 54 and 62 are engaged, it will be seen that the forward position of the slide 58 is a position of rest, so that the slide is maintained forwardly located by the cooperation of the pawl 51 and the spring 56 without any act on the part of the user to maintain the slide 58 so located.

Regarding the illustrated embodiment of the present inveniton as thus fully described as being in actual use, by manually moving the slide 58 rearwardly when a desired amount of leash 27 has moved out of the casing opening 31, the spring 56 engaged with the head of the pawl 51 is thereby permitted to push it downwardly into engagement with the particular adjacent ratchet tooth 23, thereby locking the disc 20 and so providing for leash shortening without the inconvenience of holding the unused portion of an ordinary leash in both hands or winding it around one hand. This moving of the slide 58 to lock the disc 20 is accomplished without resort to the brake mechanism and may be accomplished independently thereof, just as braking may be accomplished independently of locking.

But by reason of the illustrated embodiment of the present invention having independent braking and locking mechanisms, certain other advantageous uses are possible. If a dog has bolted as above stated and his master has grasped both the grips 18 and 49 to brake the dog's progress, reliance need not be placed on the braking mechanism alone to hold the dog back, for the slide 58 is located adjacent the bent portion 15 of the left upright arm 14, and since the user is employing his thumb as well as his fingers in the braking operation, he can conveniently move the slide 58 toward himself with one finger of his grip-grasping hand and thereby cause the pawl 51 to lock the disc 20. With such operation the grip 49 may then be released without unlocking the disc 20, and this mode of operation is preferred as the pawl 51 gives a positive locking, whereas the locking which may be effected by grasping the grips 18 and 49 is only a frictional one resulting from the engagement of the adjacent surfaces of the brake disc 21 and the brake shoe 35. As a further matter, if the dog is pulling on a shortened and locked leash and it is desired to give him greater freedom of movement, his master need merely employ his other hand to move the slide 58 forwardly to release the leash, after which he can take his hand away or move the slide rearwardly again to locking position, as circumstances warrant. But when the dog is thus demanding more leash the same result may be obtained with only one hand, the user pressing his thumb against the grip 49 in a forward direction and while grasping both grips using a finger of the same hand to push the slide 58 forwardly and so unlock the leash, after which the slide 58 may be pushed rearwardly by the user's same finger, if desired, to lock the leash, whereupon the finger may be removed from the slide without causing disengagement of the head of the pawl 51 with the adjacent ratchet tooth 23. As a final matter, it should be pointed out that since the pawl 51 is spring-pressed to hold it in engagement with a ratchet tooth 23, the pawl prevents rotation of the disc 20 in only a counter-clockwise (Fig. 1) direction and so prevents movement of a leash portion only out of the casing opening 31. As a consequence, should a dog approach his master while the disc 20 is locked, the coil spring 33 will nonetheless rotate the spool clockwise (Fig. 1), being strong enough for this purpose, and so will take up what would otherwise be slack.

Nothing herein disclosed is to be interpreted as limiting the present invention in the scope of its application to the particulars of structure or the particulars of operation or both selected for purposes of illustration. These particulars are well suited to one mechanical form of the invention, but they may be variously modified within the skill of the artisan without departing from the true scope of the actual invention, the characteristic features of which are set forth in the following claims which intentionally include generic expressions that are inclusive of various modifications.

What is claimed as new is:

1. In a reel construction characterized by a casing provided with an opening, a spool mounted in the casing for rotation in opposite directions and provided with leash-confining flanges, a leash adapted to be wound on the spool between the flanges for movement into and out of the casing by way of the opening, said leash being secured at one end to the spool and effecting rotation thereof in one direction during movement of a leash portion out of the casing, and spring means for automatically rotating the spool in the opposite direction to draw a leash portion into the casing upon a release of tension on the leash, the combination with the foregoing of means cooperable with the periphery of one flange of the spool for braking its rotative movement, ratchet teeth on the periphery of the other flange of the spool, a pawl engageable with the ratchet teeth to lock the spool in any one of a plurality of rotative positions, means tending to maintain the pawl in engagement with the ratchet, and means operable independently of said braking means for moving the pawl out of engagement with the ratchet.

2. In a reel construction characterized by a casing provided with an opening, a spool mounted in the casing for rotation in opposite directions and provided with leash-confining flanges, a leash adapted to be wound on the spool between the flanges for movement into and out of the casing by way of the opening, said leash being secured at one end to the spool and effecting rotation thereof in one direction during movement of a leash portion out of the casing, and spring means for automatically rotating the spool in the opposite direction to draw a leash portion into the casing upon a release of tension on the leash, the combination with the foregoing of a brake shoe engageable with the periphery of the one flange of the spool for braking its rotative movement, a control for moving the brake shoe into braking position, ratchet teeth on the periphery of the other flange of the spool, a pawl engageable with the ratchet teeth to lock the spool in any one of a plurality of rotative positions, means tending to maintain the pawl in engagement with the ratchet, and means operable independently of said braking control for moving the pawl out of engagement with the ratchet.

3. In a reel construction characterized by a casing provided with an opening, a spool mounted in the casing for rotative movement in opposite directions and provided with leash-confining flanges, a leash adapted to be wound on the spool for movement into and out of the casing by way of the opening, said leash being secured at one end to the spool and effecting rotation thereof in one direction during movement of a leash portion out of the casing, and spring means for automatically rotating the spool in the opposite direction to draw a leash portion into the casing upon a release of tension on the leash, the combination with the foregoing of a brake shoe engageable with the periphery of one flange of the spool for braking the rotative movement thereof, means for moving the brake shoe into braking position, means including a pawl and ratchet teeth on the periphery of the other flange of the spool for locking the spool while it is being braked, and means for moving the brake shoe out of engagement with the spool while the spool remains locked.

4. In a reel construction characterized by a casing provided with an opening, a spool mounted in the casing for rotative movement in opposite directions and provided with leash-confining flanges, a leash adapted to be wound on the spool for movement into and out of the casing by way of the opening, said leash being secured at one end to the spool and effecting rotation thereof in one direction during movement of a leash portion out of the casing, and spring means for automatically rotating the spool in the opposite direction to draw a leash portion into the casing upon a release of tension on the leash, the combination with the foregoing of a handle mounted on the casing and constructed for support by the fingers of a hand, a second handle movable toward and away from the first handle and adapted to be engaged by the thumb of said hand while the fingers thereof support the first handle, means operatively connected to the second handle for engagement with the periphery of one flange of the spool to brake the rotative movement of the spool when the second handle is moved by the thumb toward the first handle, and manually controlled means separate from the handles and including a pawl and ratchet teeth on the periphery of the other flange of the spool engageable by the pawl for locking the spool in any one of a plurality of rotative positions while said hand grasps the two handles.

5. In a reel construction characterized by a casing provided with an opening, a spool mounted in the casing for rotative movement in opposite directions and provided with leash-confining flanges, a leash adapted to be wound on the spool for movement into and out of the casing by way of the opening, said leash being secured at one end to the spool and effecting rotation thereof in one direction during movement of a leash portion out of the casing, and spring means for automatically rotating the spool in the opposite direction to draw a leash portion into the casing upon a release of tension on the leash, the combination with the foregoing of a handle mounted on the casing and constructed for support by the fingers of a hand, a second handle pivoted to the casing for swinging movement toward and away from the first handle and adapted to be engaged by the thumb of said hand while the fingers thereof support the first handle, means operatively connected to the second handle for engagement with the periphery of one flange of the spool to brake the rotative movement of the spool when the second handle is swung by the thumb toward the first handle, and manually controlled means separate from the handles and including a pawl and ratchet teeth on the periphery of the other flange of the spool engageable by the pawl for locking the spool in any one of a plurality of rotative positions while said hand grasps the two handles.

EVERETT B. SACKETT.